(12) United States Patent
Gassman et al.

(10) Patent No.: US 9,915,338 B2
(45) Date of Patent: Mar. 13, 2018

(54) BELT WEAR INDICATION

(71) Applicant: Deere & Company, Moline, IL (US)

(72) Inventors: Nicole M Gassman, Waterloo, IA (US);
Lourens M Jacobs, Cedar Falls, IA (US); Allan N Schott, Reinbeck, IA (US)

(73) Assignee: Deere & Company, Moline, IL (US)

( * ) Notice: Subject to any disclaimer, the term of this patent is extended or adjusted under 35 U.S.C. 154(b) by 157 days.

(21) Appl. No.: 14/852,640

(22) Filed: Sep. 14, 2015

(65) Prior Publication Data
US 2017/0074386 A1 Mar. 16, 2017

(51) Int. Cl.
| *F16H 57/01* | (2012.01) |
| *F16G 1/14* | (2006.01) |
| *G01M 13/02* | (2006.01) |
| *F16G 5/00* | (2006.01) |
| *G01M 17/007* | (2006.01) |
| *F16G 1/06* | (2006.01) |
| *F16G 1/00* | (2006.01) |

(52) U.S. Cl.
CPC .............. *F16H 57/01* (2013.01); *F16G 1/00* (2013.01); *F16G 1/06* (2013.01); *F16G 1/14* (2013.01); *F16G 5/00* (2013.01); *G01M 13/023* (2013.01); *G01M 17/007* (2013.01); *F16H 2057/014* (2013.01)

(58) Field of Classification Search
CPC ...... F16H 57/01; F16H 2057/014; F16G 1/00; F16G 1/06; F16G 1/14; F16G 5/00; G01M 13/023; G01M 17/007
See application file for complete search history.

(56) References Cited

U.S. PATENT DOCUMENTS

| 3,010,332 | A | * | 11/1961 | Skates | B65G 23/04 474/184 |
| 3,742,477 | A | | 6/1973 | Enabnit | |
| 4,283,455 | A | | 8/1981 | McGee | |
| 5,601,180 | A | | 2/1997 | Steeber et al. | |
| 5,714,024 | A | | 2/1998 | Tomiyama et al. | |
| 6,569,046 | B1 | * | 5/2003 | Gregg | F16G 1/28 474/102 |
| 6,715,602 | B1 | * | 4/2004 | Gartland | B65G 43/02 198/502.1 |
| 7,011,880 | B2 | * | 3/2006 | Sedlacek | F16G 1/00 428/138 |
| 7,117,981 | B2 | | 10/2006 | Logan et al. | |
| 7,308,213 | B2 | | 12/2007 | Sudo et al. | |
| 7,379,683 | B2 | | 5/2008 | Kamiya et al. | |
| 7,427,767 | B2 | | 9/2008 | Kemp | |
| 7,494,004 | B2 | | 2/2009 | Stolyar et al. | |

(Continued)

FOREIGN PATENT DOCUMENTS

| CN | 102991935 A | 3/2013 |
| EP | 0492960 B1 | 4/1996 |

*Primary Examiner* — William E Dondero
*Assistant Examiner* — Robert T Reese
(74) *Attorney, Agent, or Firm* — Lorenz & Kopf, LLP

(57) ABSTRACT

In accordance with an example embodiment, a continuous belt may include an outer surface having a first edge spaced apart from a second edge defining a belt width, and a first wear indication positioned on the outer surface near the first edge and having a first width, the first width is less than the belt width, and the first width represents the amount of allowable wear of the continuous belt.

20 Claims, 18 Drawing Sheets

(56) References Cited

U.S. PATENT DOCUMENTS

| | | |
|---|---|---|
| 7,526,230 B2 | 4/2009 | Kudo et al. |
| 7,780,561 B2 | 8/2010 | Nosaka et al. |
| 7,794,344 B2 * | 9/2010 | Ishioka ............. F16H 61/66259 |
| | | 474/28 |
| 8,755,589 B2 * | 6/2014 | Sobczak ............... G06T 7/0004 |
| | | 198/502.1 |
| 2004/0262132 A1 | 12/2004 | Pauley et al. |
| 2005/0083188 A1 * | 4/2005 | Choi .................. G01M 13/023 |
| | | 340/439 |
| 2008/0099312 A1 | 5/2008 | Lucchi |
| 2009/0303065 A1 | 12/2009 | Lipowski |
| 2010/0025199 A1 | 2/2010 | Ditaranto |
| 2010/0307221 A1 | 12/2010 | Smith et al. |
| 2012/0207493 A1 * | 8/2012 | Asano .................. G03G 15/757 |
| | | 399/36 |
| 2014/0022562 A1 | 1/2014 | Corsico Piccolino |
| 2014/0254862 A1 | 9/2014 | Sobczak et al. |
| 2015/0300959 A1 * | 10/2015 | Smith ..................... B32B 25/16 |
| | | 356/237.1 |
| 2016/0076442 A1 * | 3/2016 | Spohn .................. F02B 77/081 |
| | | 701/29.4 |

\* cited by examiner

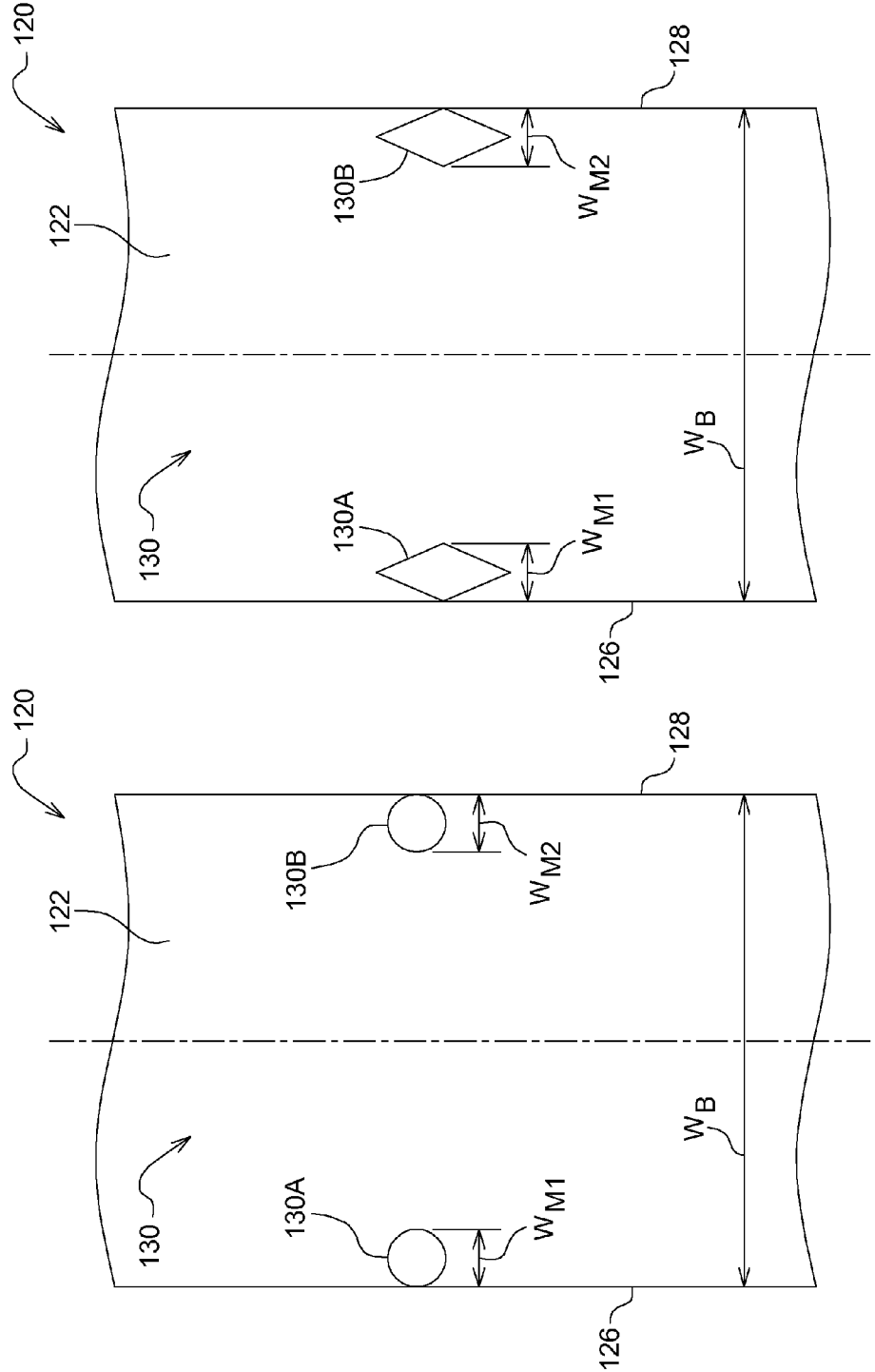

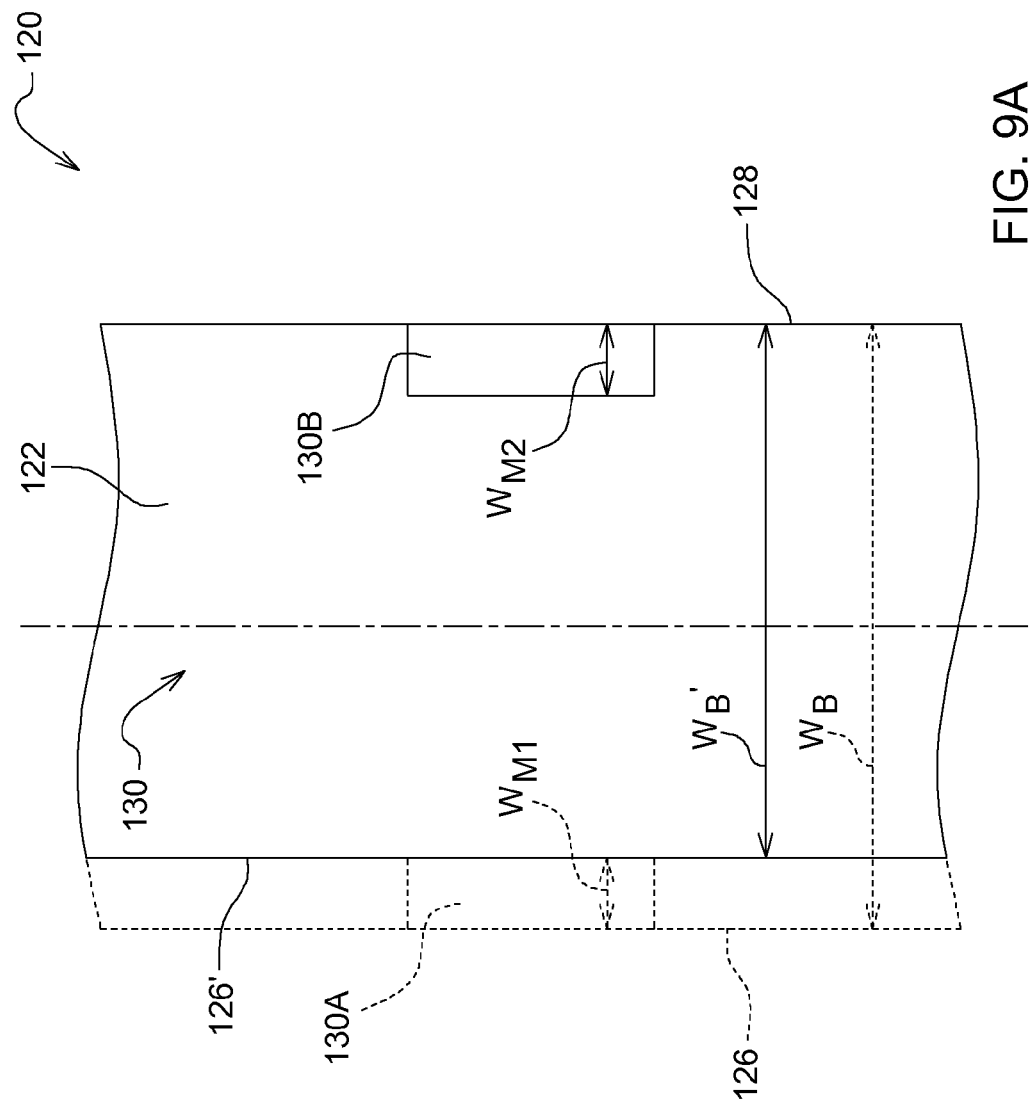

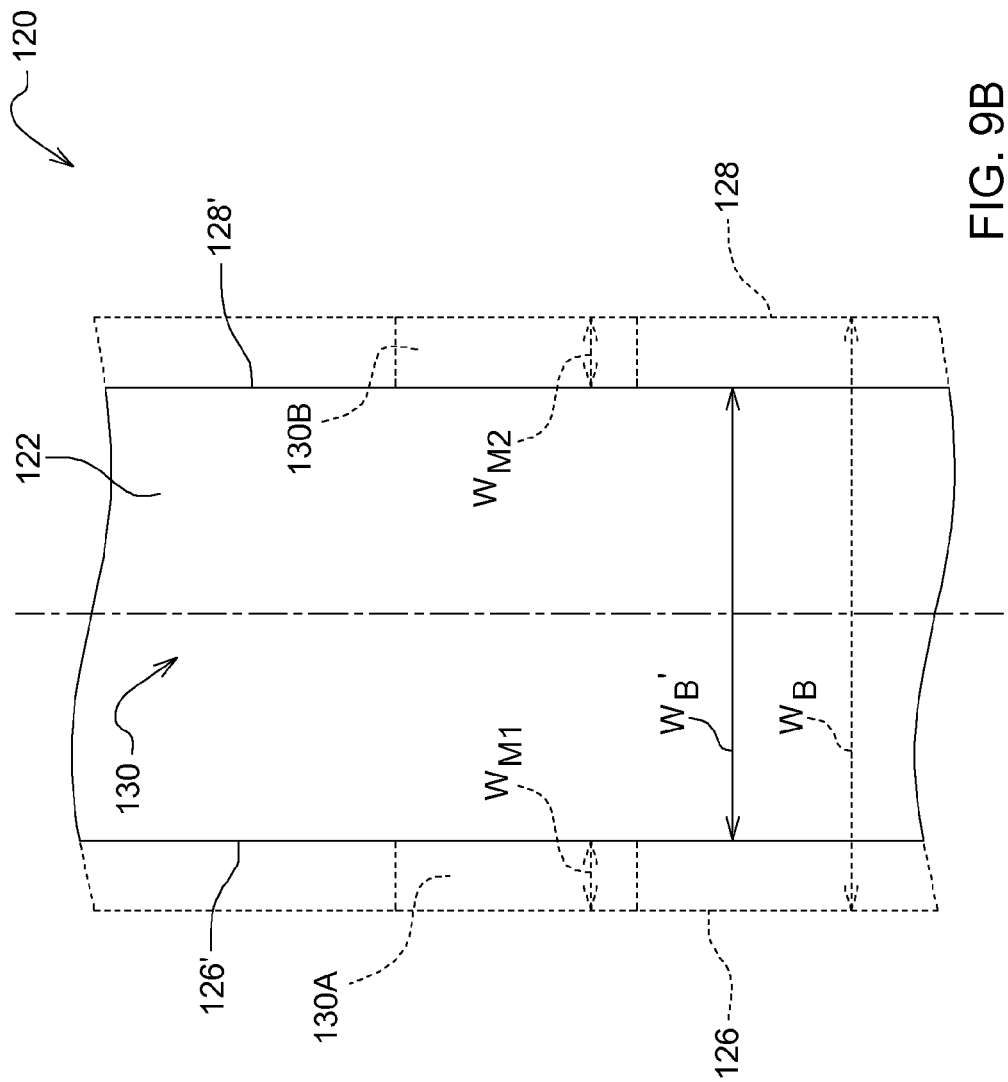

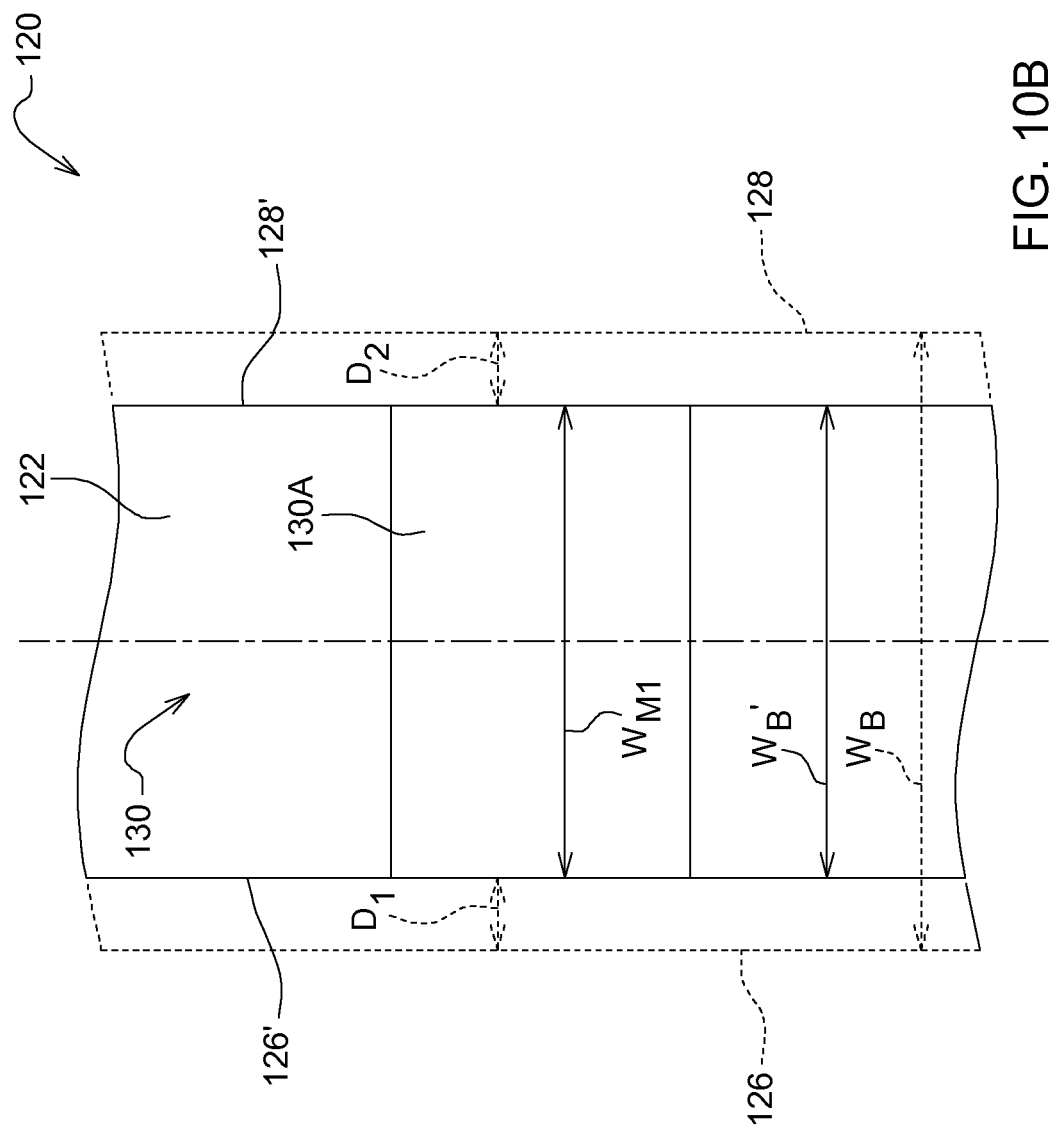

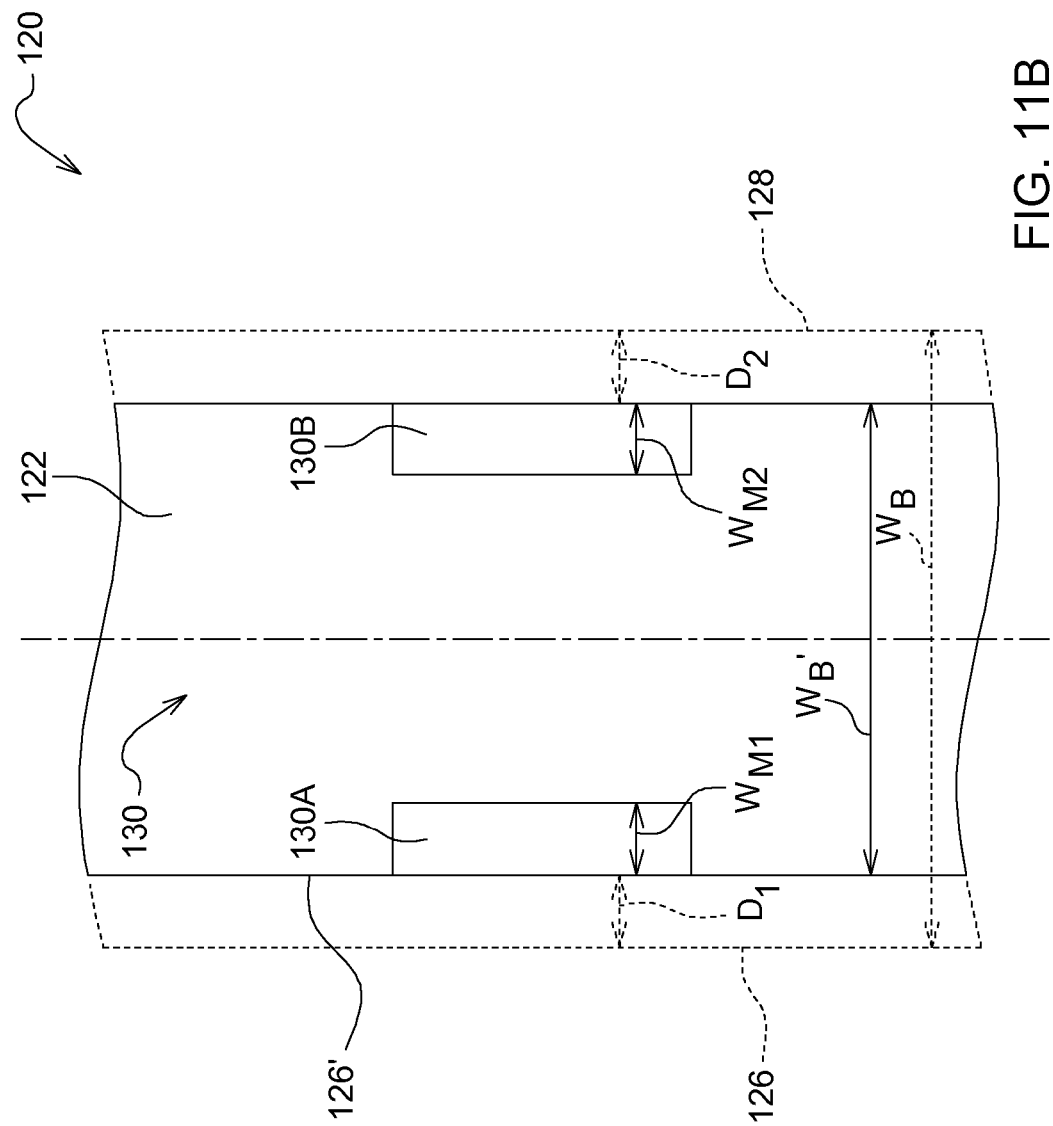

BELT WEAR INDICATION

CROSS-REFERENCE TO RELATED APPLICATIONS

N/A

FIELD OF THE DISCLOSURE

The present disclosure relates generally to drive belts used for power transmission in vehicles including work machines.

BACKGROUND

Drive belts are used for driving fans, alternators or electric generators, power steering systems, air conditioning systems, and various other vehicle systems. Drive belts are subject to wear through normal usage and must be replaced. A belt that is worn may start to slip and not provide the appropriate amount of power to the one or more vehicle systems. However, a belt that is worn and needs replaced may still appear to be in good working condition.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a continuous belt may include an outer surface having a first edge spaced apart from a second edge defining a belt width; and a first wear indication positioned on the outer surface adjacent the first edge and having a first width. The first width may represent the amount of allowable wear of the continuous belt.

According to an aspect of the present disclosure, a continuous belt may include an outer surface having a first edge spaced apart from a second edge defining a belt width; a first wear indication positioned on the outer surface adjacent the first edge and having a first width; and a second wear indication positioned on the outer surface adjacent the second edge and having a second width. The first width may represent the amount of allowable wear of the first edge of the continuous belt, and the second width may represent the amount of allowable wear of the second edge of the continuous belt.

According to an aspect of the present disclosure, a continuous belt may include an outer surface having a first edge spaced apart from a second edge defining a belt width; and a first wear indication positioned on the outer surface a first distance from the first edge and having a first width. The first distance may represent the amount of allowable wear of the continuous belt.

According to an aspect of the present disclosure, a continuous belt may include an outer surface having a first edge spaced apart from a second edge defining a belt width; and a first wear indication positioned on the outer surface a first distance from the first edge and a second distance from the second edge. The first and second distances may represent the amount of allowable wear of the continuous belt.

According to an aspect of the present disclosure, a method of placing a wear indication on a continuous belt may include positioning a first wear indication on an outer surface of the continuous belt having a first edge spaced apart from a second edge, the first wear indication positioned near the first edge, and the first wear indication representing the amount of allowable wear of the continuous belt.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 4A is a top view of a drive belt including a wear indication, according to one embodiment;

FIG. 4B is a top view of a drive belt including a wear indication, according to one embodiment;

FIG. 9A is a top view of a drive belt showing wear, according to one embodiment;

FIG. 9B is a top view of a drive belt showing wear, according to one embodiment;

FIG. 10B is a top view of a drive belt showing wear, according to one embodiment;

FIG. 11B is a top view of a drive belt showing wear, according to one embodiment;

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
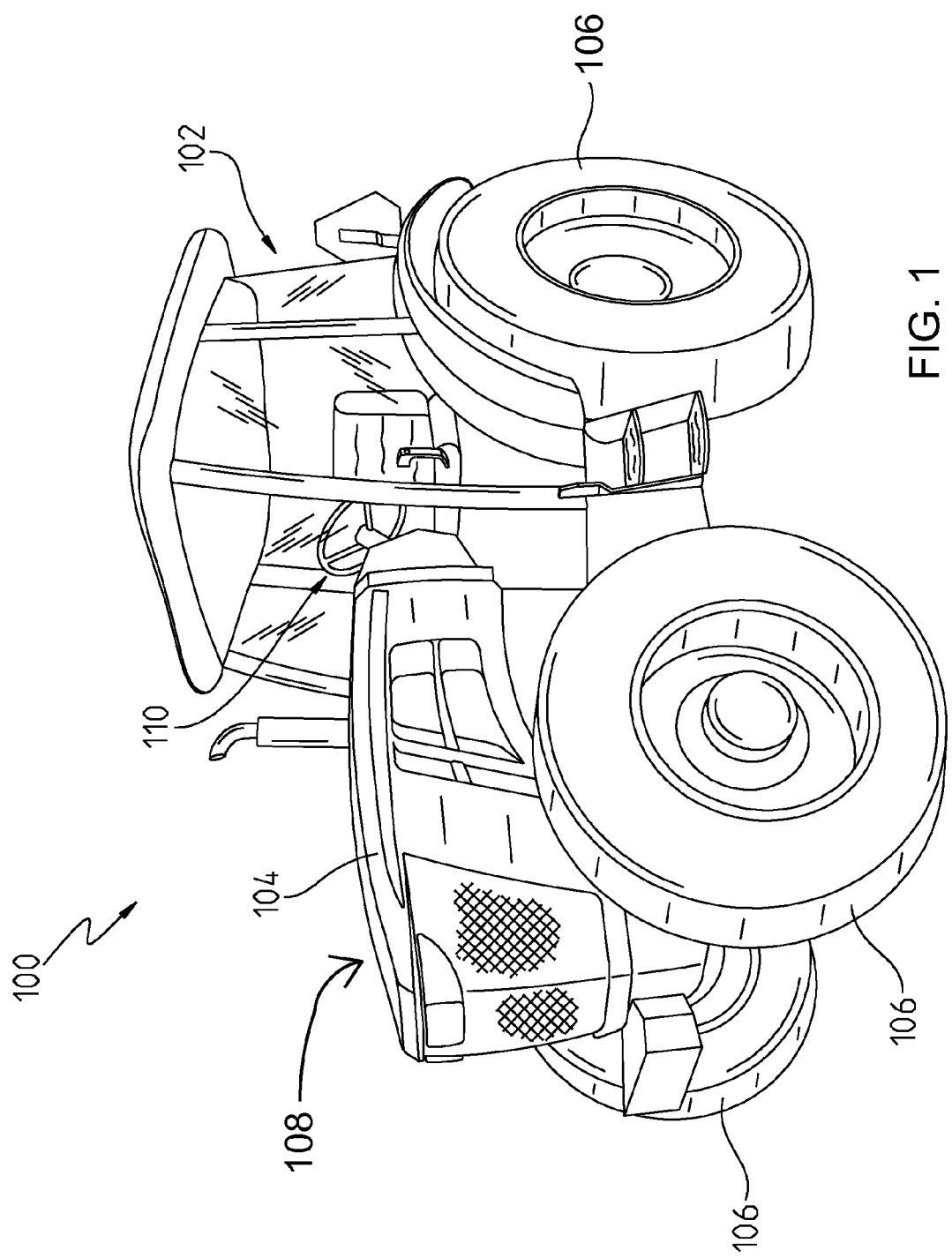
FIG. 1 is a perspective view of a work machine, according to one embodiment.

FIG. 1 illustrates a vehicle or work machine 100, such as a tractor, for example. The present disclosure also applies to other powered or motorized vehicles, machines, or equipment. The machine 100 may include an operator compartment or cab 102 where a machine operator may control the operation of the machine 100. The machine 100 may include a hood 104, one or more ground engaging apparatus 106, for example wheels, and a power source 108 located under the hood 104. The power source 108 may include one or more drive belts 120, as shown in FIG. 2.

Figure 2:
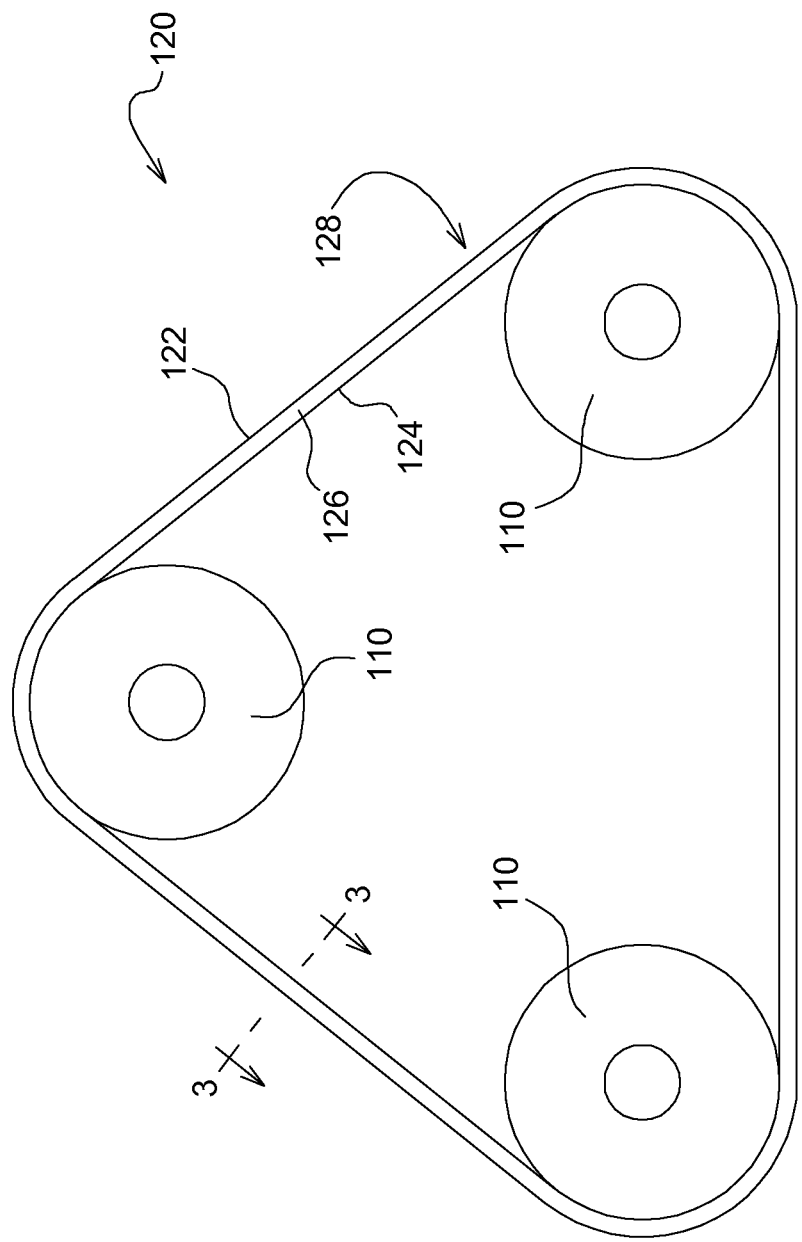
FIG. 2 is a perspective side view of a drive belt, according to one embodiment.

FIG. 2 illustrates a belt 120 having an outer surface 122, and inner surface 124, and first and second side surfaces 126, 128. The belt 120 may be continuous or endless belt. The belt 120 may be made from a variety of different materials including, but not limited to, polymers and rubber. The belt 120 may be positioned around two or more pulleys 110.

Figure 3:
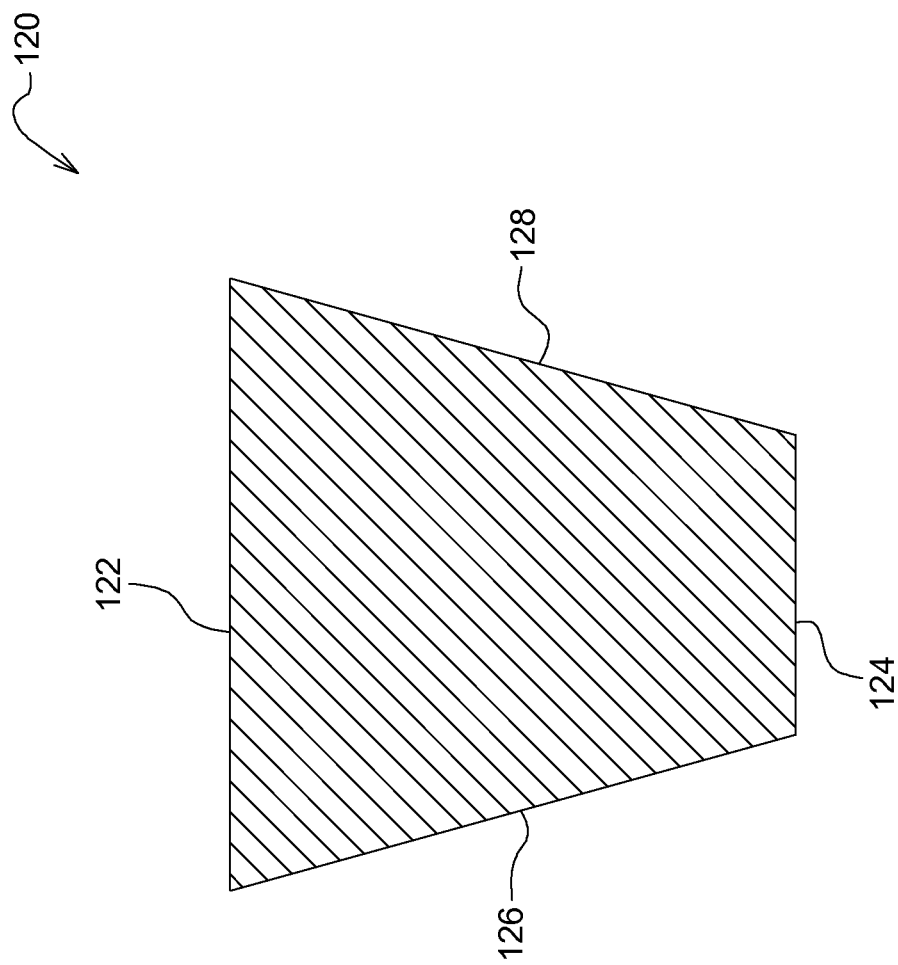
FIG. 3 is a cross-sectional view of a drive belt, according to one embodiment.

FIG. 3 illustrates a cross-sectional view of the belt 120, which may have a square, rectangular, trapezoidal, circular, or any other cross-sectional shape. The belt 120 may be a V-belt, a multi-groove belt, a ribbed belt, a toothed belt, or other type of drive belt.

Figure 4:
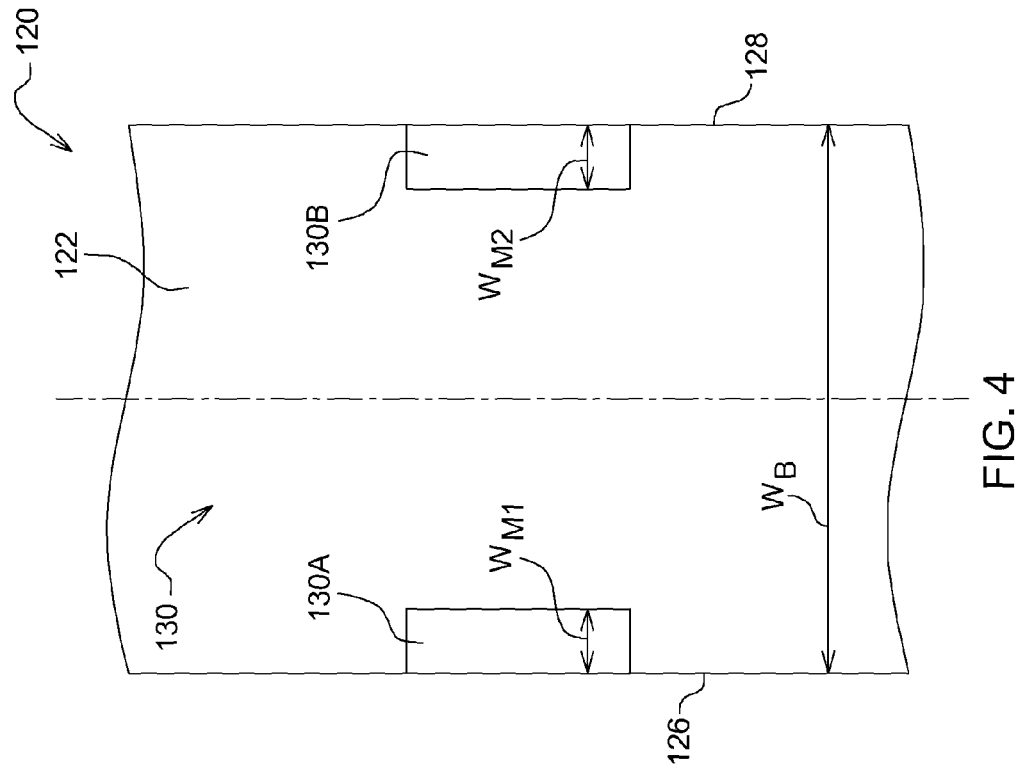
FIG. 4 is a top view of a drive belt including a wear indication, according to one embodiment.
Figure 5:
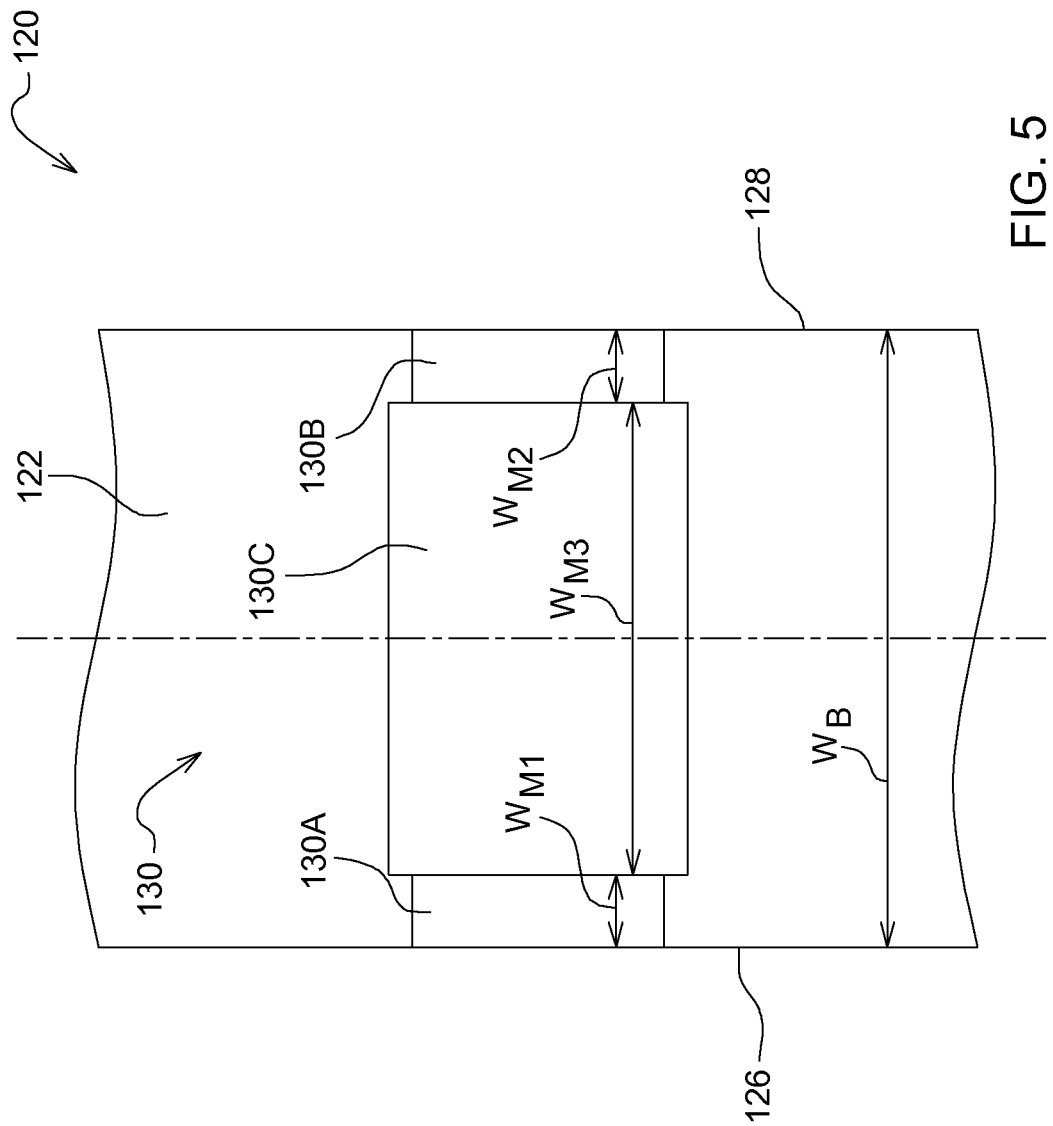
FIG. 5 is a top view of a drive belt including a wear indication, according to one embodiment.
Figure 6:
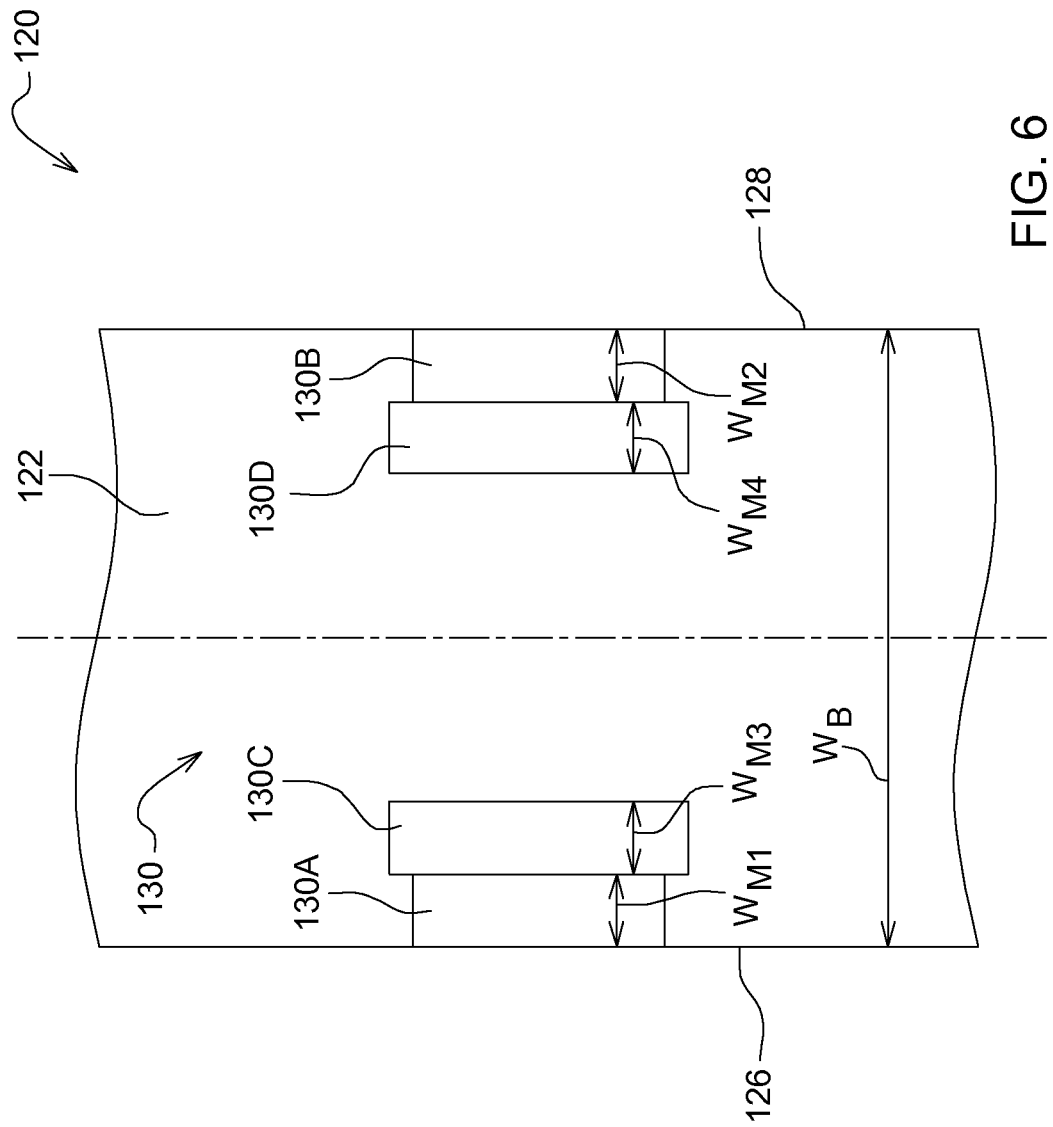
FIG. 6 is a top view of a drive belt including a wear indication, according to one embodiment.

FIGS. 4-6 illustrate several embodiments of a drive belt 120 including an outer surface 122, a first side surface 126, and a second side surface 128. The first and second side surfaces 126, 128 are spaced apart to define a belt width WB of the outer surface 122. The belt 120 may include a wear indication 130 on the outer surface 122. The wear indication 130 may have a variety of shapes including, but not limited to square, rectangular, circular, triangular, diamond, and other polygonal shapes. Two non-limiting examples are shown in FIGS. 4A and 4B. The wear indication 130 may be positioned at one or more locations on the belt 120, or the wear indication 130 may extend along the entire length of the belt 120. The wear indication 130 may include one or more wear indications 130, including a first wear indicator 130A positioned at or near the first side surface 126, and a second wear indicator 130B positioned at or near the second side surface 128. The first wear indicator 130A may be positioned adjacent the first side surface 126, and the second wear indicator 130B may be positioned adjacent the second side surface 128. Each wear indication 130 may be distinct or they may be in sets or pairs.

The first indicator 130A may be positioned such that an edge of the first indicator 130A aligns with a first edge of the outer surface 122, as shown in FIG. 4. The second indicator 130B may be positioned such that an edge of the second indicator 130B aligns with a second edge of the outer surface 122, also shown in FIG. 4. The first wear indicator 130A has a first width $W_{M1}$ and may indicate or represent an allowable or acceptable amount of wear on a first side of the belt 120. The second wear indicator 130B has a second width $W_{M2}$ and may indicate or represent an allowable or acceptable amount of wear on a second side of the belt 120. The combined first and second widths $W_{M1}$, $W_{M2}$ may indicate an allowable or acceptable amount of wear for the belt 120. The combined first and second widths $W_{M1}$, $W_{M2}$ may represent up to 25% or more of the belt width $W_B$. Each of the first and second widths $W_{M1}$, $W_{M2}$ may represent up to 25% or more of the belt width $W_B$. In some embodiments, the first and second widths $W_{M1}$, $W_{M2}$ can be 1%-25%, 1%-20%, 1%-15%, 5%-25%, 5%-20%, 5%-15%, 5%-10%, or 10%-15% of the belt width $W_B$. In one embodiment, the first and second widths $W_{M1}$, $W_{M2}$ are each about 10% of the belt width $W_B$. The first and second widths $W_{M1}$, $W_{M2}$ may be the same, substantially equal, or they may be different. The belt 120 may be considered worn and in need of replacement when the first side 126 wears through the first indicator 130A, when the second side 128 wears through the second indicator 130B, or when both the first and second sides 126, 128 wear through the respective first and second indicators 130A, 130B.

As depicted in the embodiment in FIG. 5, the belt 120 may include a third wear indicator 130C positioned between the first and second wear indicators 130A, 130B. The third wear indicator 130C may be positioned adjacent the first and second wear indicators 130A, 130B. The third indicator 130C may be positioned such that a first edge aligns with an inside edge of the first indicator 130A and a second edge aligns with an inside edge of the second indicator 130B. The third indicator 130C has a third width $W_{M3}$ and can provide an additional visual indication that the belt is worn and needs replaced. The belt 120 may be considered worn and in need of replacement when only the third indicator 130C is visible on the outer surface 122 of the belt 120.

As depicted in the embodiment in FIG. 6, the belt 120 may include a third wear indicator 130C positioned at or near the first wear indicator 130A, and a fourth wear indicator 130D positioned at or near the second wear indicator 130B. The third wear indicator 130C may be positioned adjacent the first wear indicator 130A, and the fourth wear indicator 130D may be positioned adjacent the second wear indicator 130B The third and fourth indicators 130C, 130D may provide additional indications of the amount of wear of the belt. The third and fourth wear indicators 130C, 130D each may be distinct or they may be in a set or pair. The third indicator 130C may be positioned such that an outside edge aligns with an inside edge of the first indicator 130A, and the fourth indicator 130D may be positioned such that an outside edge aligns with an inside edge of the second indicator 130B. The third wear indicator 130C has a third width $W_{M3}$ and the fourth wear indicator 130D has a fourth width $W_{M4}$. The third and fourth widths $W_{M3}$, $W_{M4}$ may be the same, substantially equal, or they may be different. The third and fourth widths $W_{M3}$, $W_{M4}$ may be dimensioned in the same or similar manner as the first and second widths $W_{M1}$, $W_{M2}$. The first and second widths $W_{M1}$, $W_{M2}$ may indicate an acceptable amount of wear on each side of the belt 120, and the third and fourth widths $W_{M3}$, $W_{M4}$ may provide an additional visual indication that the belt is worn and needs replaced.

The belt 120 may be considered worn and in need of replacement when the first side 126 wears through the first indicator 130A and the third indicator 130C is still visible, when the second side 128 wears through the second indicator 130B and the fourth indicator 130D is still visible, or when both the first and second sides 126, 128 wear through the respective first and second indicators 130A, 130B and the third and fourth indicators 130C, 130D are still visible. The belt 120 may be considered worn and in need of replacement when only the third and fourth indicators 130C, 130D are visible or when only one of the third and fourth indicators 130C, 130D is visible. The belt 120 may be considered worn and in need of replacement when any one of the four indicators is no longer visible, when any two of the four indicators are no longer visible, when any three of the four indicators are no longer visible, or when all four indicators 130A, 130B, 130C, 130D are no longer visible. Alternatively, the belt 120 may have more than four indicators, with one or more indicators positioned on each side of the belt. The belt 120 may be considered worn when any one or more indicators is no longer visible.

Figure 7:
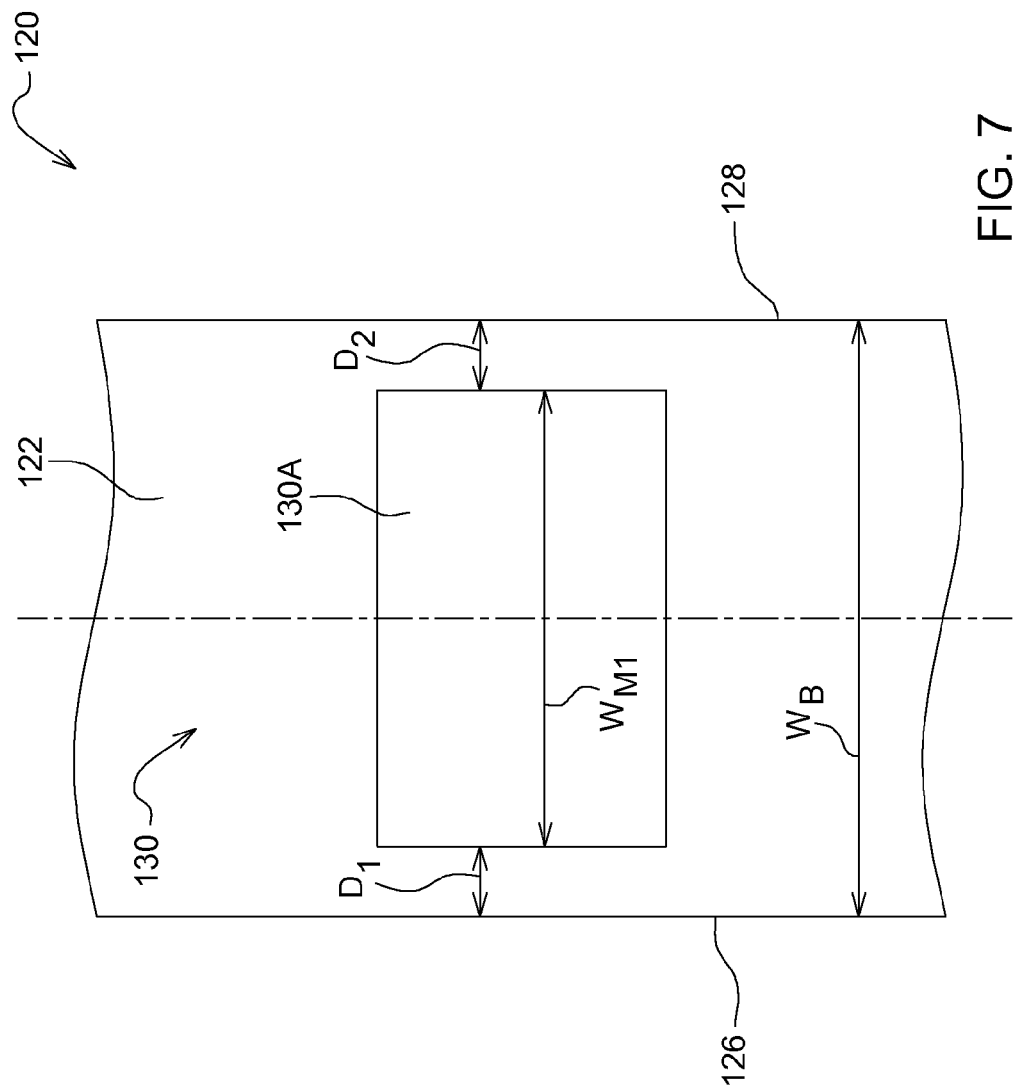
FIG. 7 is a top view of a drive belt including a wear indication, according to one embodiment.

FIG. 7 illustrates a drive belt 120 including an outer surface 122, a first side surface 126, and a second side surface 128. The first and second side surfaces 126, 128 are spaced apart to define a belt width $W_B$ of the outer surface 122. The belt 120 may include a single wear indication 130 on the outer surface 122 positioned a first distance $D_1$ from the first side surface 126 and a second distance $D_2$ from the second side surface 128. In some embodiments, the belt 120 includes only one wear indication 130. The first and second distances $D_1$, $D_2$ may indicate an acceptable amount of wear on each side of the belt 120. The first and second distances $D_1$, $D_2$ may be the same, substantially equal, or they may be different. The first and second distances $D_1$, $D_2$ may be dimensioned in the same or similar manner as the first and second widths $W_{M1}$, $W_{M2}$. The wear indication 130 has a first width $W_{M1}$. The belt 120 may be considered worn and in need of replacement when the first side 126 wears through the first distance $D_1$, when the second side 128 wears through the second distance $D_2$, or when both the first and second sides 126, 128 wear through the respective first and second distances $D_1$, $D_2$.

Figure 8:
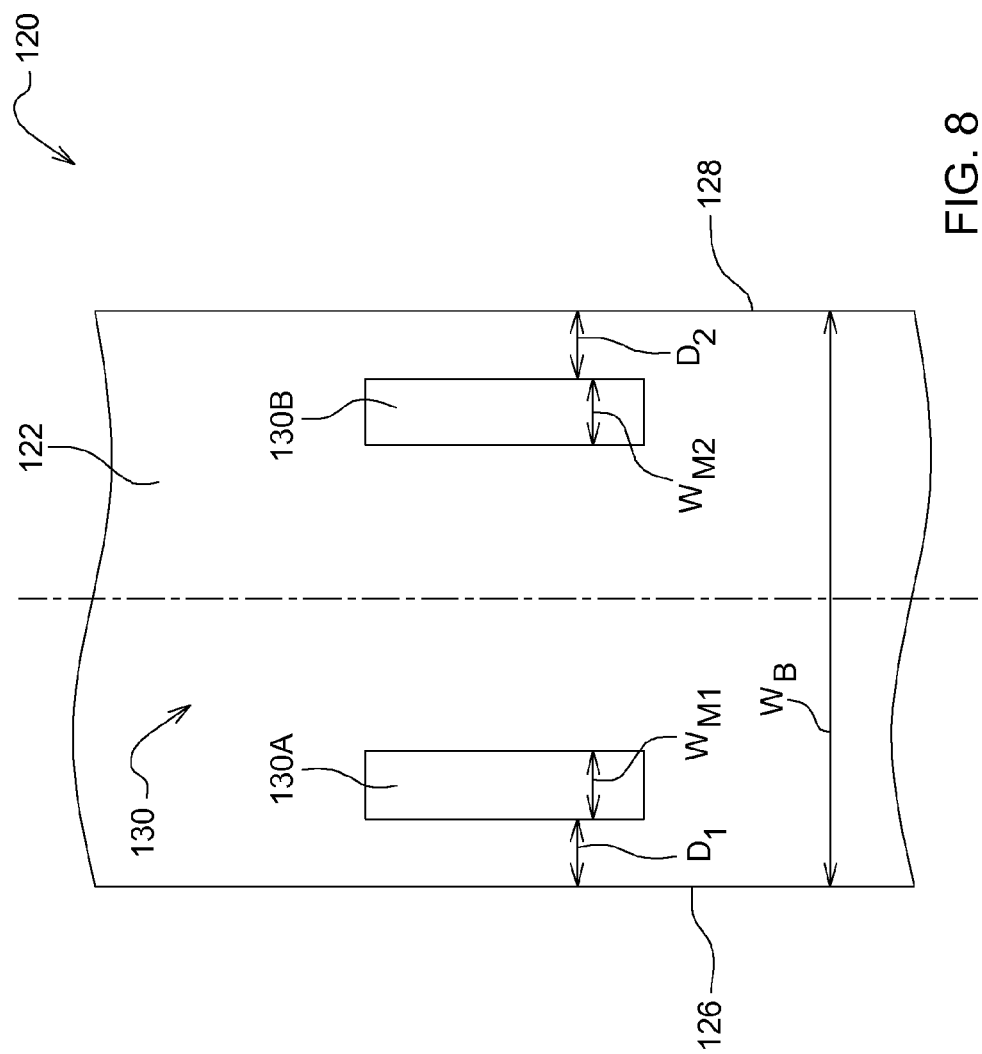
FIG. 8 is a top view of a drive belt including a wear indication, according to one embodiment.

FIG. 8 illustrates a drive belt 120 including an outer surface 122, a first side surface 126, and a second side surface 128. The first and second side surfaces 126, 128 are spaced apart to define a belt width $W_B$ of the outer surface 122. The belt 120 may include a first wear indicator 130A positioned a first distance $D_1$ from the first side surface 126, and a second wear indicator 130B may be positioned a second distance $D_2$ from the second side surface 128. The first wear indicator 130A has a first width $W_{M1}$ and the second wear indicator 130B has a second width $W_{M2}$. The first and second distances $D_1$, $D_2$ may indicate an acceptable amount of wear on each side of the belt 120. The belt 120 may be considered worn and in need of replacement when the first side 126 wears through the first distance $D_1$, when the second side 128 wears through the second distance $D_2$, or when both the first and second sides 126, 128 wear through the respective first and second distances $D_1$, $D_2$. Alternatively, the belt 120 may be considered worn and in need of replacement when the first side 126 wears through the first indicator 130A, when the second side 128 wears through the second indicator 130B, or when both the first and second sides 126, 128 wear through the respective first and second indicators 130A, 130B.

FIG. 9A illustrates the wear of a belt 120 depicted in FIG. 4, according to one embodiment. The belt 120 is worn from the original position of the first side 126 through the first width $W_{M1}$ of the first indicator 130A to the worn position of the first side 126'. The original belt width $W_B$ has decreased by the amount of wear, which includes the first width $W_{M1}$ of the first indicator 130A, to the new belt width $W_B'$. The first indicator 130A is no longer visible. This condition could indicate the belt 120 is worn and needs replaced or the belt 120 is about fifty percent worn and is still usable and operational.

FIG. 9B illustrates the wear of a belt 120 depicted in FIG. 4, according to one embodiment. The belt 120 is worn from the original position of the first side 126 through the first width $W_{M1}$ of the first indicator 130A to the worn position of the first side 126'. The belt 120 is also worn from the original position of the second side 128 through the second width $W_{M2}$ of the second indicator 130B to the worn position of the second side 128'. The original belt width $W_B$ has decreased by the amount of wear, which includes the first and second widths $W_{M1}$, $W_{M2}$, to the new belt width $W_B'$. The first and second indicators 130A, 30B are no longer visible. This condition could indicate the belt 120 is worn and needs replaced.

Figure 10A:
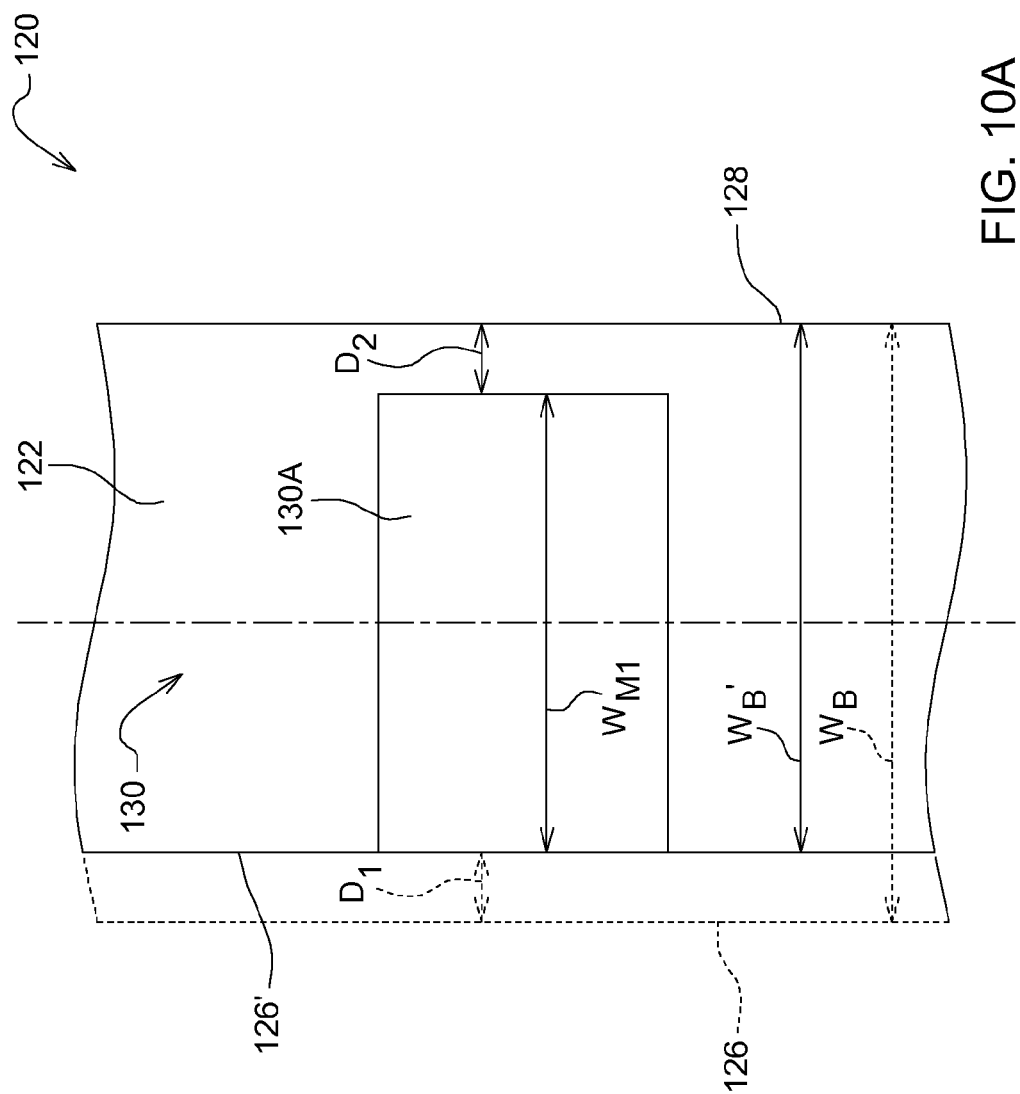
FIG. 10A is a top view of a drive belt showing wear, according to one embodiment.

FIG. 10A illustrates the wear of a belt 120 depicted in FIG. 7, according to one embodiment. The belt 120 is worn from the original position of the first side 126 through the first distance $D_1$ to the worn position of the first side 126'. The outside edge of the indicator 130A is now aligned with the worn position of the first side 126'. The original belt width $W_B$ has decreased by the amount of wear, which includes the first distance $D_1$, to the new belt width $W_B'$. This condition could indicate the belt 120 is worn and needs replaced or the belt 120 is about fifty percent worn and is still usable and operational.

FIG. 10B illustrates the wear of a belt 120 depicted in FIG. 7, according to one embodiment. The belt 120 is worn from the original position of the first side 126 through the first distance $D_1$ to the worn position of the first side 126'. The first edge of the indicator 130A is now aligned with the worn position of the first side 126'. The belt 120 is also worn from the original position of the second side 128 through the second distance $D_2$ to the worn position of the second side 128'. The second edge of the indicator 130A is now aligned with the worn position of the second side 128'. The original belt width $W_B$ has decreased by the amount of wear, which includes the first and second distances $D_1$, $D_2$, to the new belt width $W_B'$. This condition could indicate the belt 120 is worn and needs replaced.

Figure 11A:
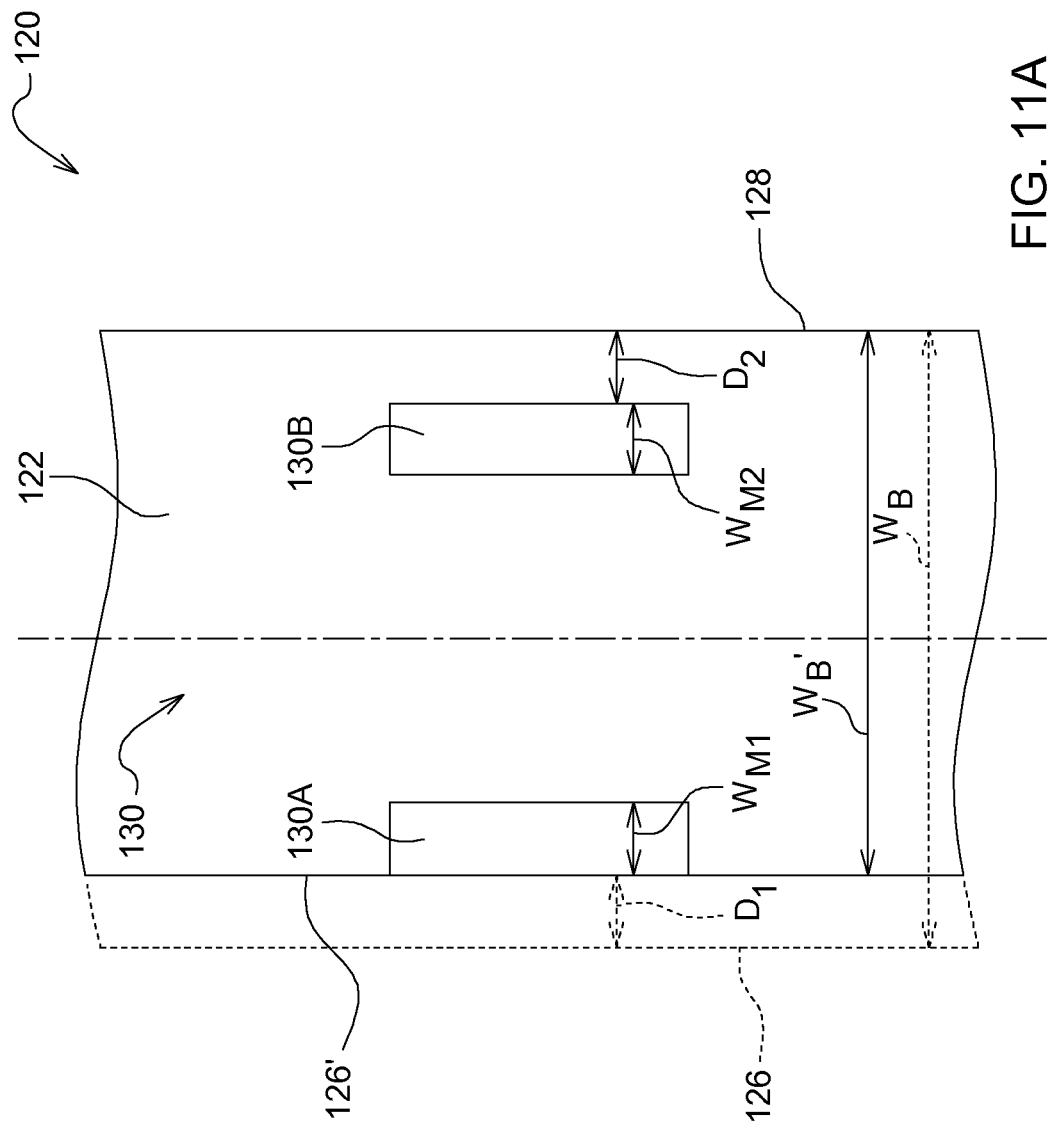
FIG. 11A is a top view of a drive belt showing wear, according to one embodiment.

FIG. 11A illustrates the wear of a belt 120 depicted in FIG. 8, according to one embodiment. The belt 120 is worn from the original position of the first side 126 through the first distance $D_1$ to the worn position of the first side 126'. The outside edge of the first indicator 130A is now aligned with the worn position of the first side 126'. The original belt width $W_B$ has decreased by the amount of wear, which includes the first distance $D_1$, to the new belt width $W_B'$. This condition could indicate the belt 120 is worn and needs replaced, the belt 120 is about twenty-five percent worn and is still usable and operational, or the belt 120 is about fifty percent worn and is still usable and operational.

FIG. 11B illustrates the wear of a belt 120 depicted in FIG. 8, according to one embodiment. The belt 120 is worn from the original position of the first side 126 through the first distance $D_1$ to the worn position of the first side 126'. The outside edge of the first indicator 130A is now aligned with the worn position of the first side 126'. The belt 120 is also worn from the original position of the second side 128 through the second distance $D_2$ to the worn position of the second side 128'. The outside edge of the second indicator 130B is now aligned with the worn position of the second side 128'. The original belt width $W_B$ has decreased by the amount of wear, which includes the first and second distances $D_1$, $D_2$, to the new belt width $W_B'$. This condition could indicate the belt 120 is worn and needs replaced or the belt 120 is about fifty percent worn and is still usable and operational.

Figure 11C:
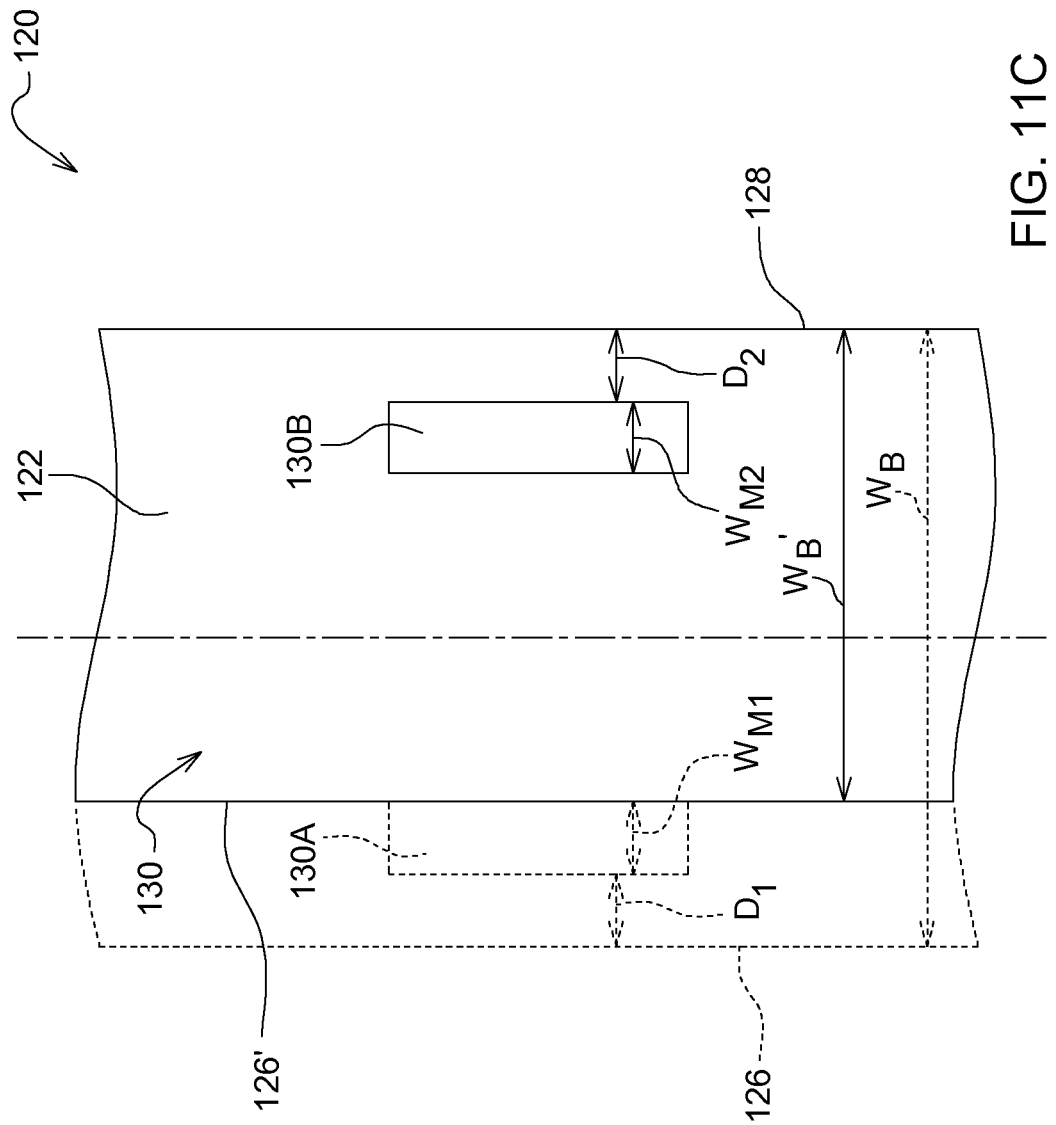
FIG. 11C is a top view of a drive belt showing wear, according to one embodiment.

FIG. 11C illustrates the wear of a belt 120 depicted in FIG. 8, according to one embodiment. The belt 120 is worn from the original position of the first side 126 through the first distance $D_1$ and the first width $W_{M1}$ of first indicator 130A to the worn position of the first side 126'. The original belt width $W_B$ has decreased by the amount of wear, which includes the first distance $D_1$ and the first width $W_{M1}$, to the new belt width $W_B'$. The first indicator 130A is no longer visible. This condition could indicate the belt 120 is worn and needs replaced or the belt 120 is about fifty percent worn and is still usable and operational.

Figure 11D:
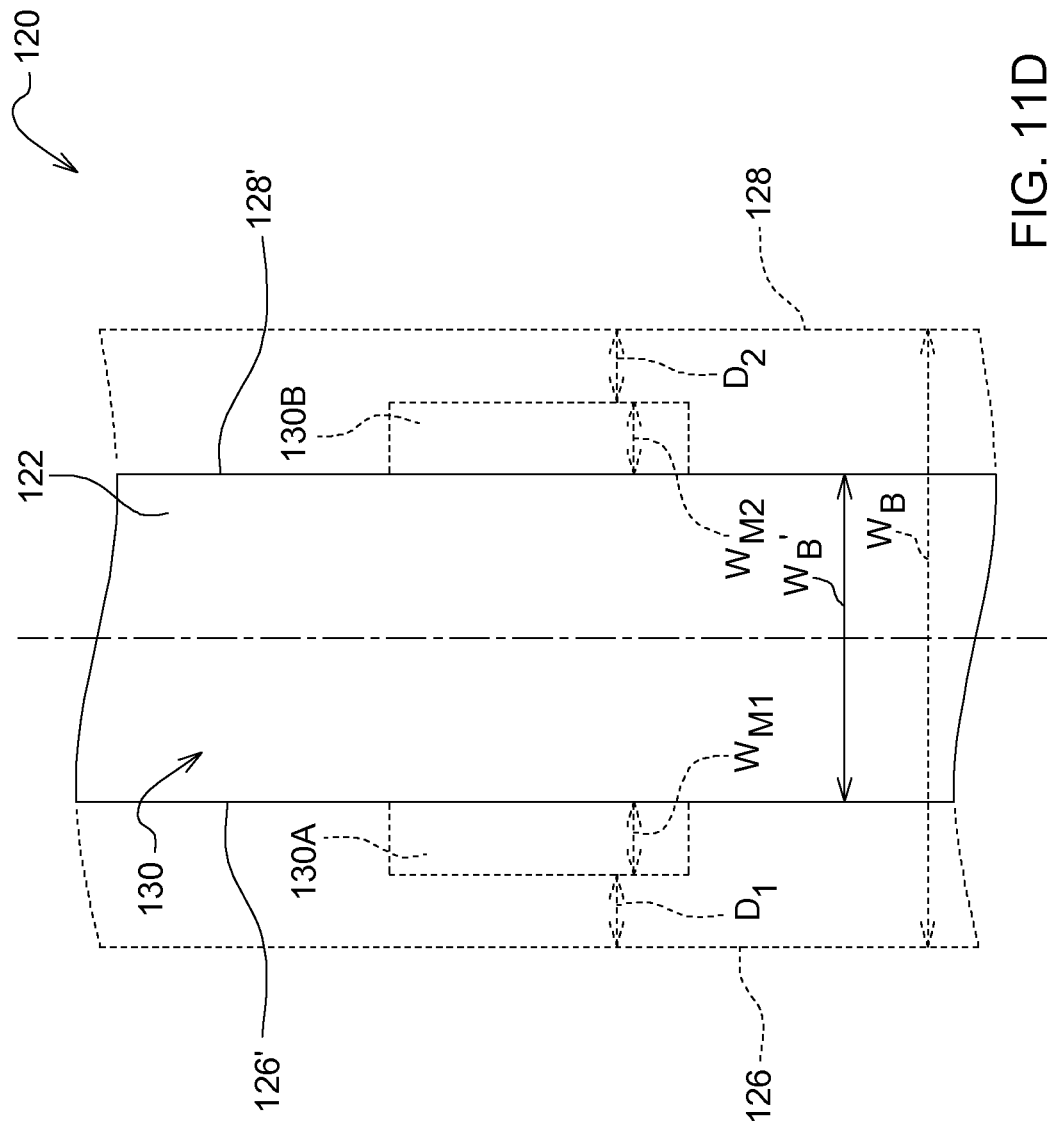
FIG. 11D is a top view of a drive belt showing wear, according to one embodiment.

FIG. 11D illustrates the wear of a belt 120 depicted in FIG. 8, according to one embodiment. The belt 120 is worn from the original position of the first side 126 through the first distance $D_1$ and the first width $W_{M1}$ to the worn position of the first side 126'. The belt 120 is also worn from the original position of the second side 128 through the second distance $D_2$ and the second width $W_{M2}$ to the worn position of the second side 128'. The original belt width $W_B$ has decreased by the amount of wear, which includes the first and second distances $D_1$, $D_2$ and the first and second widths $W_{M1}$, $W_{M2}$, to the new belt width $W_B'$. The first and second indicators 130A, 130B are no longer visible. This condition could indicate the belt 120 is worn and needs replaced.

Figure 12:
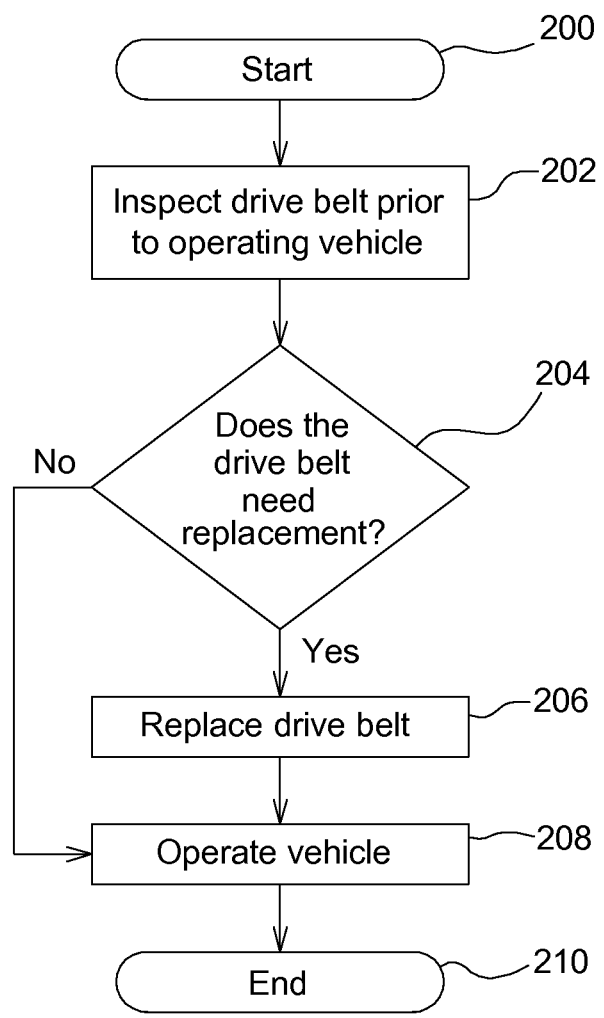
FIG. 12 is a flow diagram illustrating a method of determining when to replace a drive belt in a vehicle, according to one embodiment.

FIG. 12 illustrates a flow chart for a method of determining when to replace a drive belt in a vehicle, according to one embodiment, which may be implemented in one or more of the embodiments described herein and depicted in the various FIGURES. At step 200, the method starts.

At step 202, the drive belt 120 is visually inspected prior to operating the vehicle 100.

A step 204, a determination is made based upon a visual inspection of the belt 120 whether the drive belt 120 is worn and needs to be replaced. In any one or more of the embodiments described herein, the belt 120 may wear from the first and second side surfaces 126, 128 inwards towards the middle or center of the belt 120. For example, the belt 120 may wear from the edges, defined by the first and second side surfaces 126, 128, towards the centerline of the belt 120. The belt wear may be symmetrical, with both sides wearing the same amount or at the same rate, or asymmetrical, with each side wearing a different amount or at a different rate. The belt 120 may be considered worn and in need of replacement when one side is worn a specific amount or when both sides are worn the same or different amounts.

For example, the drive belt 120 may need to be replaced when the first indicator 130A, the second indicator 130B, or both, are no longer visible due to the wear of the drive belt 120, as shown in FIGS. 9A and 9B. In another example, the drive belt 120 may need to be replaced when the first side of the belt 126 contacts the indicator 130A, the second side of the belt 128 contacts the indicator 130A, or both sides 126, 128 contact the indicator 130A, as shown in FIGS. 10A and 10B. In still another example, the drive belt 120 may need to be replaced when the first side of the belt 126 contacts the first indicator 130A, the second side of the belt 128 contacts the second indicator 130B, or both, as shown in FIGS. 11A and 11B. In even another example, the drive belt 120 may need to be replaced when the first indicator 130A, the second indicator 130B, or both, are no longer visible due to the wear of the drive belt 120, as shown in FIGS. 11C and 11D.

If the drive belt 120 needs to be replaced, then the method proceeds to step 206.

If the drive belt 120 does not need to be replaced, then the method proceeds to step 208.

At step 206, the drive belt 120 is replaced.

At step 208, the vehicle 100 can now be operated because the drive belt 120 either did not need to be replaced or was replaced.

At step 210, the method of determining whether to replace a drive belt in a vehicle completes, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is an indication for a drive belt which signifies when a drive belt is worn and needs replaced. Another technical effect of one or more of the example embodiments disclosed herein is an indication on the outer surface of the drive belt which visually signifies when a drive belt is worn and needs replaced. Another technical effect of one or more of the example embodiments disclosed herein is a reliable apparatus and method for determining when a drive belt is worn and needs replaced through visual inspection.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A continuous belt supported by a pulley, the belt comprising:
   an outer surface at an outer side of the continuous belt opposite the pulley having a first edge spaced apart from a second edge defining a belt width; and
   a first wear indication positioned on the outer surface adjacent to the first edge and having a surface that is visually distinct from the outer surface visible from the outer side of the continuous belt, the first wear indication having a first width, the first width is less than the belt width, and the first width represents the amount of allowable wear of the first edge of the continuous belt.

2. The continuous belt of claim 1, wherein the first width is 5%-15% of the belt width.

3. The continuous belt of claim 1, wherein the continuous belt is worn and needs to be replaced when the belt width is reduced by the first width and the first wear indication is no longer visible.

4. The continuous belt of claim 1, further comprising:
   a second wear indication positioned on the outer surface adjacent the second edge and having a second width, the second width is less than the belt width, and the second width represents the amount of allowable wear of the second edge of the continuous belt.

5. The continuous belt of claim 4, wherein the first and second widths are substantially equal.

6. The continuous belt of claim 4, wherein the continuous belt is worn and needs to be replaced when the belt width is reduced by the first and second widths and the first and second wear indications are no longer visible.

7. The continuous belt of claim 4, further comprising:
a third wear indication positioned on the outer surface adjacent the first wear indication, the third wear indication represents the continuous belt is worn and needs to be replaced when only the third indication is visible.

8. The continuous belt of claim 4, further comprising:
a third wear indication positioned on the outer surface adjacent the first and second wear indications, the third wear indication represents the continuous belt is worn and needs to be replaced when only the third indication is visible.

9. The continuous belt of claim 4, further comprising:
a third wear indication positioned on the outer surface adjacent to the first wear indication; and
a fourth wear indication positioned on the outer surface adjacent to the second wear indication, the third and fourth wear indications represent the continuous belt is worn and needs to be replaced when only the third and fourth indications are visible.

10. A continuous belt supported by a pulley, the belt comprising:
an outer surface at an outer side of the continuous belt opposite the pulley having a first edge spaced apart from a second edge defining a belt width; and
a first wear indication positioned on the outer surface and having a surface that is visually distinct from the outer surface visible from the outer side of the continuous belt, the first wear indication being at a first distance from the first edge, the first distance represents the amount of allowable wear of the continuous belt.

11. The continuous belt of claim 10, wherein the first width is 5%-15% of the belt width.

12. The continuous belt of claim 10, wherein the continuous belt is worn and needs to be replaced when the belt width is reduced by the first distance and the first edge contacts the first wear indication.

13. The continuous belt of claim 10, wherein the first wear indicator is positioned a second distance from the second edge, the first and second distances being substantially equal.

14. The continuous belt of claim 13, wherein the continuous belt is worn and needs to be replaced when the belt width is reduced by the first and second distances and the first and second edges contact the first wear indication.

15. The continuous belt of claim 10, further comprising:
a second wear indication positioned on the outer surface a second distance from the second edge and spaced apart from the first wear indication, the second distance represents the amount of allowable wear of the continuous belt.

16. The continuous belt of claim 15, wherein the first and second distances are substantially equal.

17. The continuous belt of claim 15, wherein the continuous belt is worn and needs to be replaced when the belt width is reduced by the first and second distances, the first edge contacts the first wear indication, and the second edge contacts the second wear indication.

18. A method of placing a wear indication on a continuous belt supported by a pulley, the method comprising:
positioning a first wear indication on an outer surface of the continuous belt at an outer side of the continuous belt opposite the pulley, the continuous belt having a first edge spaced apart from a second edge, the first wear indication and having a surface that is visually distinct from the outer surface visible from the outer side of the continuous belt and positioned near the first edge, and the first wear indication representing the amount of allowable wear of the continuous belt.

19. The method of claim 18, further comprising:
positioning a second wear indication on the outer surface of the continuous belt, the second wear indication positioned near the second edge, the first wear indication representing the amount of allowable wear of the first edge of the continuous belt, and the second wear indication representing the amount of allowable wear of the second edge of the continuous belt.

20. The method of claim 19, further comprising:
positioning a third wear indication on the outer surface of the continuous belt, the third wear indication positioned near the first and second wear indications, the third wear indication representing a worn condition of the continuous belt when only the third indication is visible.

* * * * *